Figure 1:
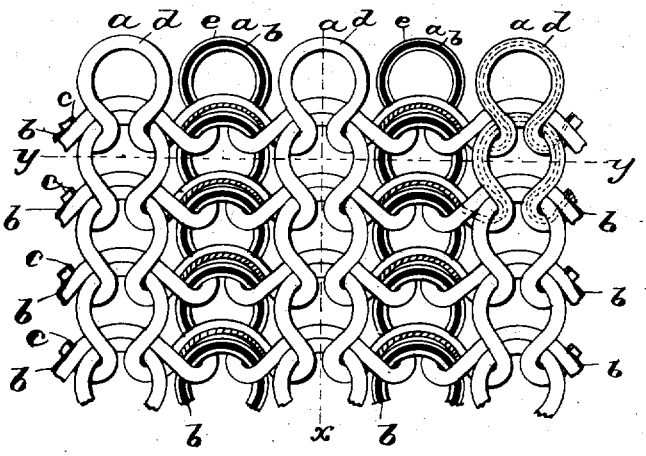

T. S. BARON.

KNIT FABRIC.

No. 10,755. Reissued Aug. 17, 1886.

Witnesses:

E. T. Walker.

Wm. E. Dyer

Inventor:

Theodore S Baron
by his Attorneys
Whitaker & Porwort.

UNITED STATES PATENT OFFICE.

THEODORE S. BARON, OF NEW YORK, N. Y.

KNIT FABRIC.

SPECIFICATION forming part of Reissued Letters Patent No. 10,755, dated August 17, 1886.

Original No. 345,021, dated July 6, 1886. Application for reissue filed July 19, 1886. Serial No. 208,504.

*To all whom it may concern:*

Be it known that I, THEODORE S. BARON, a citizen of the United States, residing at New York, in the county of New York and State of New York, have invented certain new and useful Improvements in Knit Fabrics; and I do hereby declare the following to be a full, clear, and exact description of the invention, that will enable others skilled in the art to which it appertains to make and use the same.

My invention relates to knit fabrics, and particularly to that class known as "double-ribbed" or "Cardigan" goods, designed to be made up into jackets, leggins, and like garments; and my invention consists in the fabric hereinafter described, and particularly pointed out in the claims.

As is well known in the knitting art, what is termed the "double-ribbed" or "Cardigan" stitch, so far as it is made use of, is almost wholly employed in the manufacture of garments for outside wear, in contradistinction to underwear-garments. It is desirable that articles of apparel made from a fabric of this character should be soft, spongy, and elastic, and at the same time sufficiently firm to prevent "bagging" in wear, and from otherwise getting out of shape. Durability and fine appearance are other desirable features in garments made from goods of this class.

With the yarns ordinarily used in knitting double-ribbed or Cardigan goods softness and fine appearance are secured at a cost to its firmness and durability. I have been able, after long and careful experiment, to so improve the construction of the fabric mentioned as to secure all the desirable qualities hereinbefore noted, I have found that by knitting a double-ribbed fabric of four threads or yarns—two of cotton comparatively hard-twisted and two of worsted or woolen of comparatively loose twist—upon two sets of needles, putting the cotton thread under considerable tension and knitting the worsted yarns loosely or with little tension, the cotton threads will be given a peculiar position in the fabric and be so knitted or crossed and interlooped as to form a firm foundation or backing for the ribs, similar to the backing or body of a Brussels carpet, and the worsted yarns will appear on the outer or raised surfaces of the ribs and the cotton upon the back thereof, the cotton threads acting also to fill out and re-enforce the ribs and as a cushion thereto. In this way, also, I have been able to so improve the construction of double-ribbed knit fabrics as to form the outer surfaces of the ribs of slackly-knit worsted stitches in lofty or raised position, giving to the goods a soft spongy character and showy appearance, and at the same time increase their durability or firmness, so that in wear they will look better, last longer, and, by reason of their increased firmness, not be liable to bag or become misshapen, and yet have the requisite elasticity.

My improved fabric will be better understood by reference to the accompanying drawings, forming part of this specification, in which similar letters of reference indicate corresponding parts in all the figures.

Figure 2:
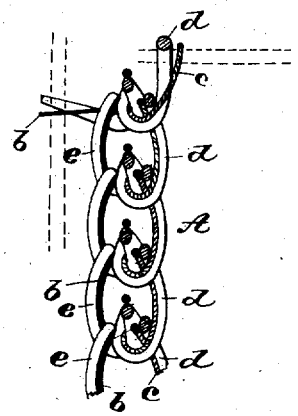
Figure 3:
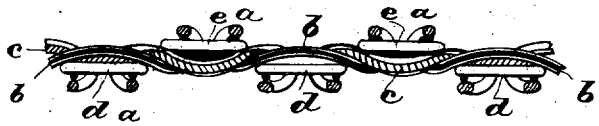
Figure 6:
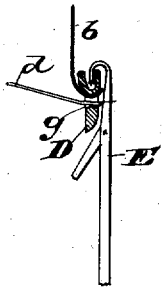
Figure 4:
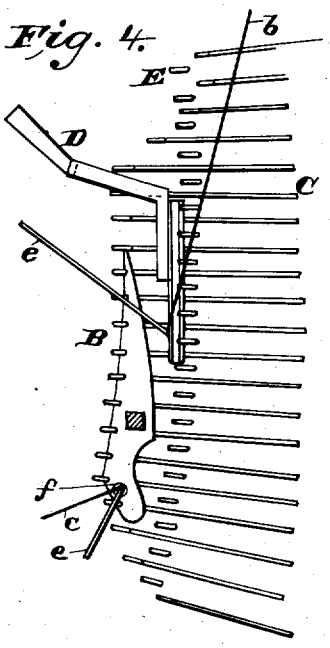
Figure 7:
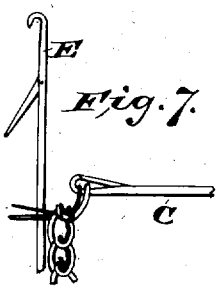
Figure 5:
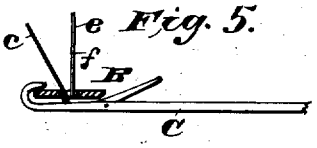

Figure 1 represents an exaggerated plan or face view of my new fabric, slightly distended in the direction of its width, the cotton threads being shown by the solid black and the crossed or hatched lines and the worsted yarns by the remaining open lines. Fig. 2 is a sectional elevation of Fig. 1, taken on the line *x x*. Fig. 3 is a sectional plan of the same, taken on line *y y*. Fig. 4 is a diagram representing the yarn-carriers and a part of two sets of the needles of a knitting-machine, and showing one of the methods which I may adopt of threading the yarn-carriers to knit my new fabric. Figs. 5 and 6 are details in section still further illustrating the mode of threading the yarn-carriers. Fig. 7 shows the position of the cotton and worsted or woolen threads on the needles at the time of forming the stitches.

The fabric A is knit to form the ribs *a a* on its opposite surfaces, and is composed of the two cotton and comparatively hard-twisted threads *b c*, and the two worsted or comparatively soft-twisted yarns *d e*, which latter lie on the upper or raised surfaces of the ribs and outside of the cotton threads *b c*, while the said cotton threads form a firm foundation or backing to the ribs, and at the same time constitute a filling and cushion therefor.

To form the fabric A, I may employ an ordinary knitting-machine having two sets or series of needles, one set of which, as represented in Fig. 4, may be horizontal and the other vertical.

In said figure, C represents a part of the horizontal, and E a part of the vertical, needles; B, the yarn-carrier for the needles C, and D the yarn-carrier for the needles E. I thread the yarn-carrier B with the worsted yarn *e* and the cotton thread *c*, and pass them through the eye *f* of the carrier in such manner that the worsted yarn *e* stands to the right while the cotton thread comes inside of the worsted yarn, so that the carrier lays the cotton thread nearer the curved parts or hooks of the needles C than it does the worsted yarn *e*, as illustrated in Fig. 7. I then thread the carrier D with the worsted yarn *d* and cotton thread *b*, passing the same through the eye *g* of the carrier D, with the worsted yarn *d* below the cotton thread *b*, so that the worsted yarn will be laid on the vertical needles E below the cotton thread *b*, as illustrated in Figs. 6 and 7. The carriers being thus threaded and considerable tension being put on the cotton threads *b* and *c*, and the worsted yarns *d* and *e* having but slight tension put thereon, and the machine put in operation, the needles will interloop the thread *b* and yarn *d* of carrier D with the thread *c* and yarn *e* of carrier B, and form chain-stitch ribs *a* on both sides of the fabric, and alternately cross the said threads and yarns, and pass the same therein over and under each other, and the needles in casting off the stitches will ship the cotton threads *b c* over and under the worsted yarns *d* and *e*, so that the worsted yarns will form the upper or outer surfaces of the ribs knit in comparatively soft, loose, and lofty stitches, while the cotton threads will be so interlooped as to form a firm foundation or backing to the ribs, and at the same time fill out and cushion the ribs so as to give them a plump rope-like appearance. If my fabric A is left in its normal condition, the ribs *a* will lie close together, giving both surfaces of the goods the appearance of being knit entirely of worsted yarns; but if the fabric is distended in the direction of its width, or the direction in which the rows of stitches are knit, as represented in Fig. 1, from the fact that the cotton threads form the backing or foundation of the ribs *a*, the fabric will have the appearance of having soft plump ribs formed of worsted yarn, and the spaces intervening between the ribs formed of closely-knit cotton threads. In this manner, as before remarked, the outer or upper surfaces of the ribs of the fabric A will be of good quality yarns and loosely knit so as to form lofty ribs with soft spongy surfaces, while the low-grade threads will at once form a backing or foundation to the ribs *a* and fill out and cushion the outer surfaces of the same, which outer surfaces take all the wear in the use of the goods, and thus increase the firmness and durability of the fabric, and in case an outer yarn of the ribs *a* wears off or is broken the fabric will not ravel, but the unbroken foundation or backing threads will hold the broken ends of the broken loop or stitch and thus prevent raveling.

I am aware that fabrics designed for underwear-garments have heretofore been knit in plain stitch of threads or yarns, which were so spun as to form the outer surfaces thereof of silk and the interior of cotton; but the structure of such fabric does not differ from ordinary plain knit goods, and is obviously essentially different from the structure of my fabric.

I am also aware that an English patent describes a fabric, also designed for underwear-garments, knitted in plain stitch with four threads—two of cotton and two of silk—in which it is attempted to so lay or dispose the threads on the needles as that the silk threads shall entirely envelop the cotton threads, forming the interior entirely of cotton and both surfaces entirely of silk. In this instance, however, all of the threads are knit into the fabric under the same tension, as though the fabric were knit in plain stitch of a single thread of four untwisted strands. The low-grade threads do not form a backing or foundation to the wales, but simply run through the interior of the fabric and thicken the goods with a view to avoid materially increasing its cost.

I am also aware that it has been proposed to form plain-knitted fabrics of two threads or sets of threads of different colors or materials, one of said threads or sets of threads being introduced into the material at a greater tension than the other, so that one set shall form one face of the fabric and the other the other face of the same. This I do not broadly claim. In my fabric, which differs in structure materially from this, the low-grade threads not only thicken the goods and keep down the cost of manufacture, but they form a firm backing or foundation to the soft and loosely knit surfaces of the ribs of high-grade yarns, and at the back of or between the ribs the low-grade threads are not entirely enveloped or concealed by the high-grade yarns. It will be understood, of course, that instead of using worsted yarns, I may employ silk or other high-grade yarns in their stead, and that I may substitute linen or other like threads for the cotton.

Having thus described my improved fabric and set forth a mode by which it may be produced, though not herein claiming the latter, what I do claim, and desire to secure by Letters Patent of the United States, is—

1. As a new article of manufacture, a knit double-ribbed fabric formed from four threads or yarns, two of superior and two of inferior grade, the yarns of superior grade being knitted loosely on the outer or upper surfaces of the ribs and crossed and interlooped at the interior of the fabric, and the threads of inferior grade knitted and interlooped more closely and forming a backing or foundation to the ribs and filling out or re-enforcing and cushioning the same, substantially as described.

2. As a new article of manufacture, a knit double-ribbed fabric formed from four threads or yarns, two of worsted of comparatively loose twist and two of cotton of comparatively hard twist, the worsted yarns being knitted loosely on the outer or upper surfaces of the ribs and crossed and interlooped at the interior of the fabric, and the cotton threads knitted or interlooped more closely and forming a backing or foundation to the ribs and filling out or re-enforcing and cushioning the same, substantially as described.

In testimony whereof I affix my signature in presence of two witnesses.

THEODORE S. BARON.

Witnesses:
E. T. WALKER,
M. P. CALLAN.